United States Patent
Haskal et al.

(10) Patent No.: US 11,859,774 B2
(45) Date of Patent: Jan. 2, 2024

(54) METHOD FOR MANUFACTURING A LIGHTING DEVICE

(71) Applicant: SIGNIFY HOLDING B.V., Eindhoven (NL)

(72) Inventors: Eliav Itzhak Haskal, Eindhoven (NL); Hugo Johan Cornelissen, Eindhoven (NL); Maarten Van Lierop, Eindhoven (NL); Henricus Franciscus Bonekamp, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 470 days.

(21) Appl. No.: 16/852,701

(22) Filed: Apr. 20, 2020

(65) Prior Publication Data

US 2020/0318797 A1 Oct. 8, 2020

Related U.S. Application Data

(62) Division of application No. 15/038,166, filed as application No. PCT/EP2014/074954 on Nov. 19, 2014, now Pat. No. 10,634,310.

(30) Foreign Application Priority Data

Nov. 25, 2013 (EP) .................................... 13194165

(51) Int. Cl.
*F21K 9/232* (2016.01)
*F21V 3/06* (2018.01)
(Continued)

(52) U.S. Cl.
CPC ............... *F21K 9/232* (2016.08); *F21K 9/23* (2016.08); *F21K 9/66* (2016.08); *F21K 9/90* (2013.01);
(Continued)

(58) Field of Classification Search
CPC ... F21K 9/232; F21K 9/66; F21K 9/90; B29C 2791/007; B29L 2031/747; B29L 2031/7472; F21V 3/049
See application file for complete search history.

(56) References Cited

U.S. PATENT DOCUMENTS

| 4,101,618 A | 7/1978 | Aoki |
| 6,048,083 A | 4/2000 | McDermott |

(Continued)

FOREIGN PATENT DOCUMENTS

| CN | 202868396 U | 4/2013 |
| JP | 2006016035 A | 1/2006 |

(Continued)

OTHER PUBLICATIONS

Database WPI, Week 201452, Thomson Scientific, London, GB; AN 2014-N59230, XP002736025,—& KR20130068512 A (SHIM HS) Jun. 26, 2013 (2 Pages).

*Primary Examiner* — William N Harris

(57) ABSTRACT

A method is provided, wherein a lighting device (200, 300, 400, 500) comprising an at least partly light transmitting envelope (110) and a solid state light source (120) is manufactured. The method comprises arranging (710) an at least partly light transmitting plastic material (140) in a mold (130) having a surface structure (132) arranged on an inner surface portion of the mold and blow molding (720) the plastic material so as to form the envelope. During the blow molding, the surface structure is at least partly transferred to the at least partly light transmitting plastic material, thereby forming an optical structure (150) on a portion of an outer surface of the envelope. The envelope is then removed (730) from the mold and arranged (740) to at least partly enclose the solid state light source. The optical structure may be formed to generate a desired optical effect.

8 Claims, 7 Drawing Sheets

(51) Int. Cl.

| | |
|---|---|
| *F21K 9/23* | (2016.01) |
| *F21V 3/02* | (2006.01) |
| *F21K 9/66* | (2016.01) |
| *F21K 9/90* | (2016.01) |
| *F21V 5/00* | (2018.01) |
| *F21V 5/04* | (2006.01) |
| *F21V 7/00* | (2006.01) |
| *F21V 14/06* | (2006.01) |
| *F21V 19/00* | (2006.01) |
| *F21V 3/04* | (2018.01) |
| *B29K 105/00* | (2006.01) |
| *B29C 49/06* | (2006.01) |
| *F21Y 101/00* | (2016.01) |
| *B29C 49/58* | (2006.01) |
| *F21Y 103/10* | (2016.01) |
| *F21Y 115/10* | (2016.01) |
| *B29L 31/00* | (2006.01) |

(52) U.S. Cl.
CPC ............... *F21V 3/02* (2013.01); *F21V 3/049* (2013.01); *F21V 3/062* (2018.02); *F21V 5/005* (2013.01); *F21V 5/045* (2013.01); *F21V 7/00* (2013.01); *F21V 14/06* (2013.01); *F21V 19/006* (2013.01); *B29C 49/06* (2013.01); *B29C 49/58* (2013.01); *B29C 2791/007* (2013.01); *B29C 2949/0761* (2022.05); *B29K 2105/258* (2013.01); *B29L 2031/747* (2013.01); *F21Y 2101/00* (2013.01); *F21Y 2103/10* (2016.08); *F21Y 2115/10* (2016.08)

(56) References Cited

U.S. PATENT DOCUMENTS

| | | | |
|---|---|---|---|
| 6,483,439 | B1 | 11/2002 | Vukosic |
| 8,953,926 | B1* | 2/2015 | Kelly ................ F21V 7/04 362/628 |
| 2006/0034077 | A1 | 2/2006 | Chang |
| 2010/0314808 | A1 | 12/2010 | Chuang |
| 2011/0031871 | A1 | 2/2011 | Lai et al. |
| 2011/0110105 | A1* | 5/2011 | Kenney ............... F21V 1/00 362/351 |
| 2011/0242823 | A1 | 10/2011 | Tracy et al. |
| 2012/0038260 | A1 | 2/2012 | Lu et al. |
| 2012/0092852 | A1 | 4/2012 | Doan et al. |
| 2012/0188771 | A1 | 7/2012 | Kraus et al. |
| 2012/0243216 | A1* | 9/2012 | Lai ..................... F21K 9/69 362/218 |
| 2013/0107545 | A1* | 5/2013 | Tai ..................... F21V 3/026 362/363 |
| 2013/0294071 | A1 | 11/2013 | Boomgaarden et al. |
| 2014/0268632 | A1* | 9/2014 | Yang ................... F21V 3/12 362/235 |

FOREIGN PATENT DOCUMENTS

| | | |
|---|---|---|
| JP | 3169860 U | 8/2011 |
| JP | 2012093683 A | 5/2012 |
| JP | 2012195130 A | 10/2012 |
| KR | 20130068512 A | 6/2013 |
| WO | 2010103477 A1 | 9/2010 |

\* cited by examiner

PRIOR ART

METHOD FOR MANUFACTURING A LIGHTING DEVICE

CROSS-REFERENCE TO PRIOR APPLICATIONS

This application is a Divisional of U.S. Ser. No. 15/038,166, filed May 20, 2016, which is the U.S. National Phase application under 35 U.S.C. § 371 of International Application No. PCT/EP2014/074954, filed Nov. 19, 2014, which claims the benefit of European Application No. 13194265.8, filed Nov. 25, 2013. These applications are hereby incorporated by reference herein.

FIELD OF THE INVENTION

The invention relates to a method of manufacturing a lighting device with a molding process and to a lighting device with a plastic envelope provided with an optical structure.

BACKGROUND

The possibility to control or modify light distribution from a lighting device is of interest for various applications, such as general illumination, room lighting, exterior lighting, decorative lighting or marketing. Depending on the application, a specific light distribution in terms of light cone angle, color distribution, and patterns that can be projected in the far field or the near field may be desired.

In for example US 2013/0294071 A1, a bulb with a prismatic optics is used to obtain a nearly uniform distribution of light about a luminaire. The prismatic optics include several optic parts having sidewalls with light refracting grooves and protruding members. The grooves and the protruding members are formed to alter the refraction of light emitted from the luminaire so as to achieve a more uniform light distribution.

Although such a luminaire may provide a desired light distribution, there is still a need for improved lighting devices and also methods for manufacturing such devices.

SUMMARY OF THE INVENTION

It is an object of the present invention to provide an improved method for manufacturing a lighting device providing a desired light distribution or optical effect.

It is also an object of the present invention to provide such a lighting device.

These and other objects are achieved by means of a method and a lighting device having the features defined in the independent claims. Preferable embodiments of the invention are characterized by the dependent claims.

Hence, according to a first aspect of the present invention, a method for manufacturing a lighting device comprising an at least partly light transmitting envelope and a solid state light source is provided. In the method, an at least partly light transmitting plastic material is arranged in a mold having a surface structure that is arranged on an inner surface portion of the mold. Further, the plastic material is blow molded so as to form the at least partly light transmitting envelope. During the blow molding, the surface structure is at least partly transferred to the at least partly light transmitting plastic material, thereby forming an optical structure on a portion of an outer surface of the at least partly light transmitting envelope. The at least partly light transmitting envelope is then removed from the mold and arranged to at least partly enclose the solid state light source.

According to a second aspect, a lighting device is provided which comprises an at least partly light transmitting envelope and a solid state light source. The at least partly light transmitting envelope comprises an at least partly light transmitting plastic material and an optical structure arranged on a portion of its outer surface, wherein the at least partly light transmitting envelope is arranged to at least partly enclose the solid state light source.

In embodiments according to the first and second aspects, a plastic envelope (which in the context of the present application may also be referred to as housing or bulb or bulb housing) for a solid state light source can be manufactured using a molding technique such as blow molding, whereby an optical structure, such as e.g. a diffractive or refractive optical structure, is designed to allow for a desired optical effect and patterned in a surface of the mold, such that the optical structure is transferred to the surface of the bulb. The desired optical effect can thus be obtained from the envelope, or bulb housing itself. The envelope may have any shape where the solid state light source, e.g. comprising light emitting diode, LED, elements, fit inside. The process to fabricate the envelope as well as the bulb itself is characterised by the above-mentioned aspects.

Further, by replacing the tungsten filament of incandescent lamps known in the art with LEDs, e.g. arranged in an LED chimney, it is possible to lower the price of the overall LED bulb by also replacing the relatively more expensive glass bulb with a relatively less expensive plastic bulb. Further, this may improve electrical safety because a lamp with a plastic bulb may have a reduced risk of breaking as compared with a glass bulb. Hence the risk for exposure of electrically conducting parts within the envelope may be reduced. The lower operating temperature of the LED elements (lower heat dissipation) as compared with e.g. an incandescent lamp allows for the glass material of the envelope to be replaced with a plastic material that can be blow molded and hence provided with the optical structure.

A plastic envelope or bulb can be manufactured using blow molding or injection molding techniques, among other plastic molding techniques. Transparent or at least partly light transmitting materials might include polyethylene terephtalate (PET) or transparent polyethylene (PE), polypropylene (PP), poly(vinyl chloride) (PVC) or others. If blow molding is used, then a premold of the plastic material is made and then "blown" or "pressed" into a hard metal mold such that its shape matches the shape of the mold. The (new) molded or pressed plastic is then removed from the mold. Blow molding is advantageous in that it is a relatively fast process as compared to e.g. injection molding. Blow molding may be performed at relatively lower temperatures, which may reduce or even eliminate time otherwise required for cooling and/or solidification of the plastic material. Further, a lower processing temperature may reduce wear of the mold and hence increase reliability and durability of the blow molding tools.

While it is often economically unfeasible to introduce fine structures in a typical injection molding metal mold, fine, diffractive optical elements or surface structures can be introduced into a blow molding mold and then relatively rapidly transferred to the blow molded plastic envelope as an optical structure. This advantageously allows for a method to make a lamp bulb, or envelope, in plastic material wherein this blow molding technique is used. The present aspects describe a process to fabricate plastic lamp bulbs with predefined optical structures on the outside of the bulbs, as transferred from the metal mold, whose optical effects can range from collimation, scattering, lensing, various watermarking or trademarking optical effects, far field and near field effects. The optical structure, which e.g. may be refractive, diffractive or a combination of both, may be introduced in the mold and transferred to the bulb. The present aspects further relate to a lighting device comprising a plastic envelope or plastic bulb housing with optical structures on the outside of the bulb.

As compared to current glass bulb manufacturing, the use of blow molding of plastic to form the bulb may reduce the cost of the bulb housing component. Blow molding is also advantageous in that the molds may be shaped to any desired size or volume, and that the inside of the mold can be designed with arbitrary surface structure for forming the optical structures at the envelope. With the introduction of these modified molds into a blow molding manufacturing facility, a significant cost-down in the bulb housing itself may be achieved together with desirable optical or branding effects.

The present aspects are advantageous over standard or prior art glass bulbs, in which optical effects such as frosting or collimation are obtained by coating of the inside of the bulbs with metal films or other materials such as silica. Generally, gluing an optical foil on the inside or outside of a 3D shape of such bulb is difficult, and optical structures cannot effectively be etched or patterned directly into the glass surface at a reasonable price level. Hence, using a plastic bulb is advantageous since effects associated with the optical foil industry (whose foils are made using injection molding techniques, in general) can be introduced by placing the optical structures inside the blow mold.

In at least some embodiments a blow molding technique is used to fabricate an envelope for a solid state light source, such as a LED lamp bulb, from plastic, to introduce an optical structure at the surface of the bulb, via a surface structure of a mold, which then renders an optical effect from the bulb.

The optical structures which may be transferred to the surface of the bulb may be manifold, yet grouped into several subtopics. For example, polychromatic, monochromatic, near- and farfield, refractive and diffractive effects may be achieved, including projection of images. Therefore, color versus angle distribution from the bulb may be modified, corrected or strengthened. The effects may therefore be beam forming, decorative, watermarking, collimating, diffusing, color mixing or more. Further, the bulbs, or envelopes, may be formed into other shapes than the "drop" shape of a typical incandescent bulb, which is advantageous in that it allows for an asymmetric light distribution to be modified in order to distribute light more evenly or, e.g., to the edges or sides of the lighting device.

The solid state light source may comprise light emitting diodes, LEDs. It will however be understood that the solid state light source may in principle comprise any kind of solid state element that is able to generate and emit light. Red/green/blue (RGB) LEDs may advantageously be used to provide dynamic color light output from the lighting device. The solid state elements may be of the same type or of different types.

According to an embodiment, the optical structure may comprise a light refracting structure adapted to refract light exiting the at least partly light transmitting envelope.

According to an other embodiment, the optical structure may comprise a light diffracting structure adapted to diffract light exiting the at least partly light transmitting envelope.

It will however be appreciated that the optical structure may comprise both a light refracting structure and a light diffracting structure.

According to an embodiment, the optical structure may comprise at least one of grooves, protrusions, micro grooves, microprotrusions, micro prismatic grooves, micro prismatic protrusions, a lens, a Fresnel lens and a diffraction grating.

According to an embodiment, the optical structure may be adapted to diffract light exiting the at least partly light transmitting envelope such that a visual pattern may be formed in the far field and/or in the near field. The optical structure may e.g. be associated with a trademark, wherein a concentric grating, focusing nearby at e.g. 20-30 cm, may be introduced to provide a possibility to check counterfeiting or brand loyalty in the ON state, i.e. during operation (turn-on) of the lighting device. The optical structure may e.g. generate a small colored, e.g. green spot at this distance. Alternatively, or additionally, the optical structure may comprise a concentric diffraction grating focused at infinity, thereby creating a spot in far field (e.g. a green, red, or blue spot). Further, the bulb may be patterned with a diffractive grating or a Fresnel lens to create a far field pattern such as a cloud or flower which might appear on the wall, or on the shade at a certain distance, etc. The visual pattern may hence be a decorative pattern, wherein e.g. patches of Fresnel lenses or other lenses may create a pattern in far field or near field. One example includes sparkling light bulbs in a chandelier construction (also referred to as Crystal effect). An external focusing lens may be arranged in an optical path of the lighting device to focus the visual pattern in the far field.

According to an embodiment, the optical structure may be adapted to diffract light exiting the at least partly light transmitting envelope so as to provide a predetermined color distribution. The optical effects provided by the optical structure can hence be used polychromatically, wherein e.g. a LED bulb packaging may be provided for improved color mixing of red/yellow/white/green/blue (RYWGB) sources such as modified Hue lamps. Advantageously, this allows for beam steering of different colors in different directions.

According to an embodiment, the optical structure may be adapted to diffract and/or refract light exiting the at least partly light transmitting envelope so as to provide a predetermined angle distribution of the light. The optical structure may e.g. be formed as a collimating structure or a lens structure for focusing the generated light beam.

According to further embodiments, the optical structure may be adapted to form a visual pattern at the outer surface portion of the at least partly light transmitting envelope and/or adapted to diffract light from the solid state light source such that a visual pattern may be formed at the outer surface portion of the at least partly light transmitting envelope. Such optical structures may be introduced to stamp e.g. a trademark on the bulb surface, e.g. in fine print a company logo (or any other visual pattern), visible in OFF state, on the top of the bulb. Alternatively, a diffractive grating could be arranged around the bulb body itself, which creates e.g. a green ring around the bulb—also visible in the off state (e.g. the Philips "GreenLine" bulb), or even the blue Philips company name. A visual pattern, such as e.g. "Philips", may also be formed on the bulb and provided with a specific grating wavelength, which lights up with light of a particular wavelength (such as a HeNe laser). This advantageously allows for bulb inspection in sockets to be done from afar.

According to an embodiment, the optical structure may comprise an at least partly light reflecting structure arranged to reflect light back into an interior of the at least partly light transmitting envelope. Such reflecting structure may, advantageously, improve the light output of the bulb in terms of uniformity. One example is the so called LED chimney, which comprises a set of LED modules that are wrapped around a central cylinder and thereby leave a black spot at the top of the chimney or the top of the bulb (to comply to Energy Star requirements). The present embodiment is advantageous in that such reflecting structure allows for at least some of the issues of non-uniform light distribution from the bulb to be alleviated. The reflecting structure may e.g. comprise micro prismatic grooves acting as total internal reflection mirrors. Collimating reflector may be obtained without the use of metal coatings. The emission pattern of the LED source can hence be redirected by the reflecting structure in order to improve the uniformity of the light emitted from the lighting device.

According to an embodiment, the at least partly light transmitting envelope may be shaped like a bulb or a tube. It will however be appreciated that the at least partly light transmitting envelope may be provided with other shapes like elliptical (oval) bulbs, square bulbs, etc., and that each may be provided with an optical structure matched to produce a certain effect. Further, the envelope may be adapted to transmit or transport light within the material of the envelope, e.g by means of internal reflection within the material, such that light can be spread or guided in directions parallel with a surface of the envelope. The envelope may hence be used as a light guiding element that e.g. may increase the spread of light generated by the light source and hence increase homogeneity of light out-coupled from the envelope. The amount of light being guided within the envelope may e.g be increased by reducing a distance between the envelope and the light source. Further, the envelope may comprise light extraction means arranged to output internally transmitted light at desired positions at the envelope. Such light extraction means may e.g. comprise light reflecting particles and light reflecting structures.

According to an embodiment, the method may further comprise arranging a light refracting lens in an optical path of the lighting device to focus a visual pattern in the far field, wherein the visual pattern may be formed of light being diffracted by the optical structure.

Other objectives, features and advantages of the present invention will appear from the following detailed disclosure as well as from the drawings.

Generally, all terms used in the claims are to be interpreted according to their ordinary meaning in the technical field unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated. Further, it will be appreciated that the various embodiments described for the method according to the first aspect are all combinable with embodiments of the lighting device as defined in accordance with the second aspect.

BRIEF DESCRIPTION OF THE DRAWINGS

These and other aspects will now be described in more detail with reference to the appended drawings showing embodiments of the present invention.

FIGS. 2b and c show cross-sectional top views of a lighting device similar to the one shown in FIG. 2a.

FIG. 4a shows a three-dimensional side view of a lighting device according to another embodiment.

FIG. 4b shows a cross-sectional side view of a portion of the envelope of the lighting device in FIG. 4a.

FIG. 4c shows a three-dimensional side view of a lighting device similarly configured as the lighting device shown in FIG. 4a.

All the figures are schematic, not necessarily to scale, and generally only show parts which are necessary in order to elucidate the embodiments, wherein other parts may be omitted or merely suggested. Like reference numerals refer to like elements throughout the description.

DETAILED DESCRIPTION

The present aspects will now be described more fully hereinafter with reference to the accompanying drawing, in which currently preferred embodiments are shown. The invention may be embodied in many different forms and should not be construed as limited to the embodiments set forth herein; rather, these embodiments are provided for thoroughness and completeness, and fully convey the scope of the present aspects to the skilled person.

Figure 1:
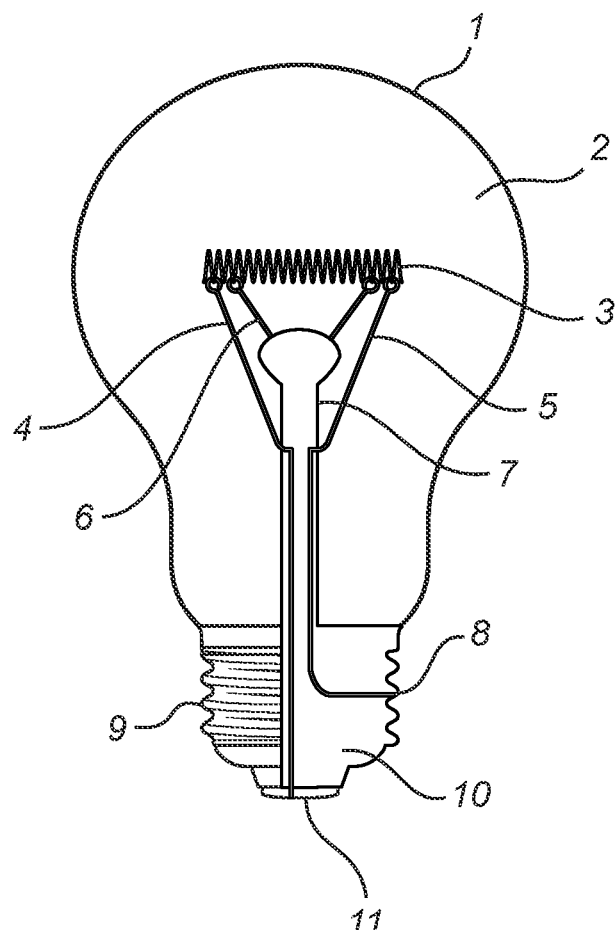
FIG. 1 shows a prior art incandescent lamp.

FIG. 1 illustrate an incandescent lamp known in the prior art. The lamp comprises a glass bulb 1 enclosing a low pressure inert gas 2 such as argon, nitrogen, krypton or xenon, and a tungsten filament 3 arranged on a glass stem 7 by means of electrically insulated support wires 6. The tungsten filament 3 is electrically connected to a contact wire 4 that goes out of the stem 7, through a cap or sleeve 9 and to an electrical terminal or contact 11. The filament 3 is also connected to another contact wire 5 that goes into the stem 7 and to the cap 9. The cap 9 and the contact 11 are electrically insulated from each other by means of an electrical insulation 10, such as vitrite.

FIGS. 2a-d illustrate lighting devices 200 according to some embodiments of the present invention. In line with the present embodiment, the lighting device comprises an at least partly light transmitting envelope 110 and a solid state light source 120. The envelope 110 may also be referred to as a bulb 110 and may be arranged to at least partly enclose the solid state light source 120. The bulb 110 according to the present embodiment provides optical effects such as collimation, and may improve the light output of the bulb 110 to be more uniform. The light source 120 may be formed as a LED chimney 120 which is a set of LED modules wrapped around a central cylinder, or cylindrical holding member 122 having an axial extension along an optical axis O of the lighting device. Such light source 120 may leave a black spot at the top of the chimney 120, or the top of the bulb 110. Further, an optical structure 150 may be formed on a portion of an outer surface of the envelope 110. The optical structure 150 may e.g. be formed during manufacturing of the envelope 110, such as during a blow molding process of the envelope 110. The optical structure 150 may e.g. be formed by a surface structure arranged on an inner surface portion of a mold (not shown in FIG. 2*a*) used in the blow molding process. Such optical structure 150 may alleviate at least some of the issues of light distribution from the bulb.

Figure 2A:
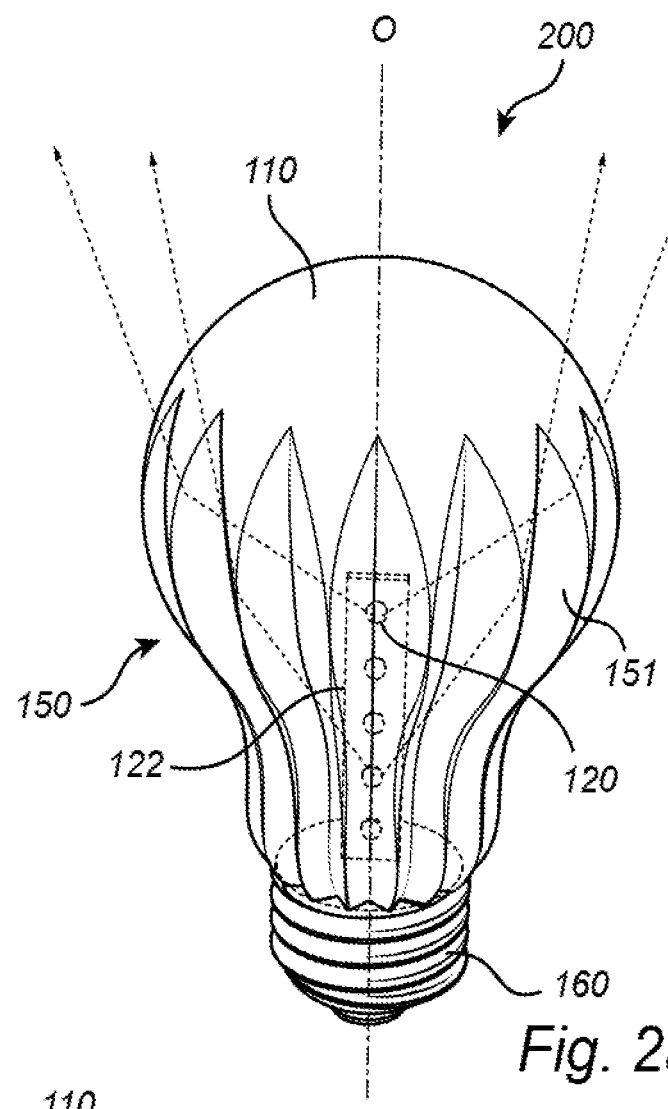
FIG. 2a shows a three-dimensional side view of a lighting device according to an embodiment.

According to some embodiments, such as shown in FIG. 2*a*, the optical structure 150 may comprise grooves in a bottom part of the bulb housing, i.e. the portion of the housing closest to a socket 160 of the lighting device 100. The grooves 151 may e.g. be micro- or nano-grooves 151 and may be lengthwise oriented from south to north (should the lighting device 100 be standing in a vertical direction, i.e. the optical axis O being aligned with a vertical direction), i.e. along the optical axis O, or the optical path of the lighting device 100, and in a direction away from the socket 160. Micro-grooves should be understood as grooves having an average depth in the range of 1-1000 μm, whereas nano-grooves refer to grooves having an average depth of less than 1 μm. The grooves 151 may e.g. be arranged on a lower or bottom half of the envelope 110.

Figure 2B:
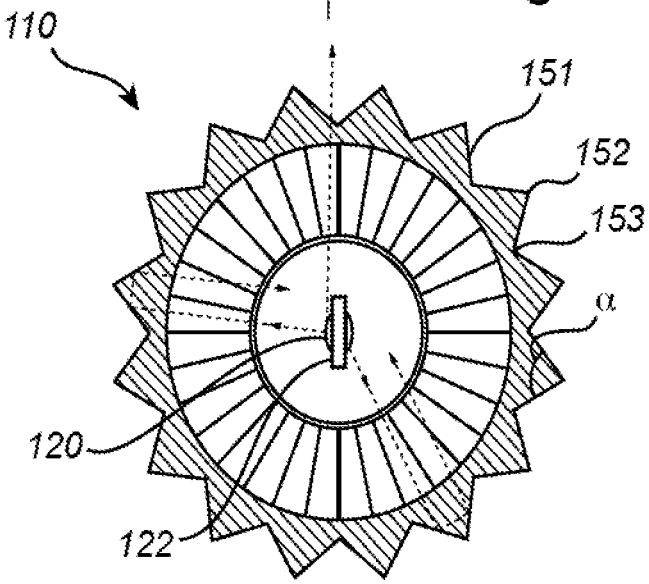

Turning now to FIG. 2*b*, which shows a cross-sectional top view of the lighting device of FIG. 2*a*, an example of micro-prismatic grooves 151 is shown. Micro-prismatic grooves may e.g. be provided with a peak 152 with a top angle α of approximately 90° and a feature size or valley 153 depth of 10-100 micrometers, such as 25-100 micrometers. Such micro-prismatic grooves 151 may act efficiently as total internal reflection mirrors adapted to reflect impinging light (represented by arrows in FIG. 2*b*). This may provide a collimating reflector without the use of light reflecting metal coatings.

Turning back to FIG. 2*a*, such collimating effect can be achieved with the envelope 110 and the optical structure 150 according to the present embodiment. Light emitted by the LEDs 120 may be reflected at the optical structure 150, redirected upwards, in a direction away from the socket 160, and emitted from the lighting device 200 through the upper or north portion of the at least partly light transmitting envelope 110. Light emitted from mainly side-emitting light sources 120 may therefore be redirected so as to provide a mainly top-emitting lighting device 200. It will however be appreciated that the optical structure 150 may be configured such that at least some light exits the envelope 110 through the optical structure 150. The amount of light exiting through the optical structure 150 may e.g. depend on the angle of incidence, wherein total internal reflection e.g. may occur for light impinging at an angle of incidence exceeding a critical angle of the optical structure 150. Additionally, external focusing lens 170 is provided which is arranged to be external to (and separate from) the bulb 110 and to project an image of the logo 154 on e.g. a wall or surface.

Figure 2C:
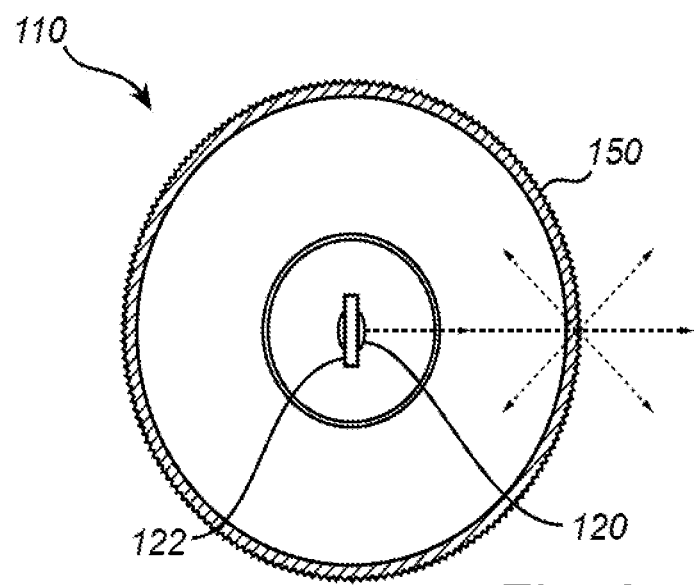

FIG. 2*c* is a cross-section of a similar lighting device as that described with reference to FIGS. 2*a* and *b*, wherein the optical structure 150 comprises a nano-structure which may be arranged to reflect and/or to diffuse light emitted by the light source 120. The nano-structure 150 may e.g. have an average feature size of less than 1 micrometer.

Figures 2D, 2E:
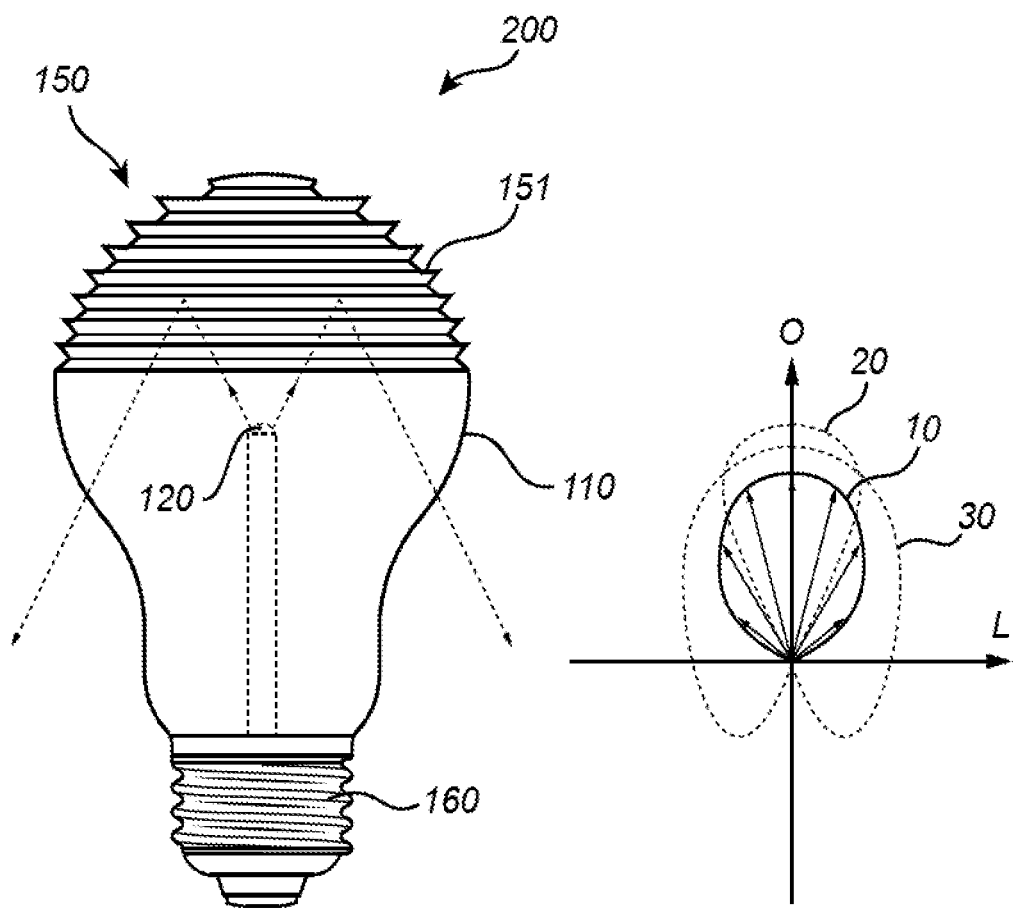
FIG. 2d shows a cross-section of a lighting device according to another embodiment.
FIG. 2e illustrates different examples of illumination patterns according to an embodiment.

FIG. 2*d* shows a lighting device 200 similarly configured as the lighting device described with reference to FIGS. 2*a* and *b*. However, the optical structure 150, which may comprise grooves or micro-grooves, may be arranged in the top or north part of the bulb housing, oriented from east to west so as to form concentric circles or a spiral having a centre coinciding with the optical axis O of the lighting device 200. The micro-prismatic grooves 151 may e.g. be provided with a peak or sharp corner having a top angle α of approximately 90° and a feature size or valley depth of 10-100 micrometers, thereby allowing light emitted by the light source 120 to be reflected and the resulting light beam to be reshaped or redirected.

The embodiments described with reference to FIGS. 2*a*-*d* thereby allow for beam shaping, wherein grooves 151, such as e.g. micro-grooves, in the top or bottom part of the bulb housing 110 may be arranged to redirect the emitted light. An emission pattern of a LED source, directed north, can e.g. be steered to go partially south, thereby being more compliant with requirements relating to energy saving. At least some problems associated with beam shaping of light from an incandescent replacement LED-bulb can hence be addressed. Effects associated with the beam shaping can for instance include collimation effects, lensing effects (Fresnel) or scattering.

In FIG. 2*e*, two examples of such emission patterns are illustrated. The emission pattern of the light source 120 is represented by arrows inscribed in an area 10 defined by a solid line. The arrows indicate the different directions in which light is emitted from the light source 120, in this example along the optical axis O, i.e. directed north, and in directions ranging between the optical axis and a lateral axis L being orthogonal to the optical axis. The length of the arrows, or the distance from the enclosing line and origo, indicates the relative amount of light emitted in that direction. The longer arrow, the more light may be emitted in that direction.

The dotted line 20 illustrates the emission pattern of a lighting device according to FIGS. 2*a* and *b*, wherein the optical structure 150 may be arranged in the bottom part of the bulb 110. As shown in FIG. 2*e*, the emission pattern may be redirected upwards such that a lighting device having a top-lighting character may be provided.

Further, the dashed line 30 illustrates the emission pattern of a lighting device according to FIG. 2*d* wherein the optical structure 150 may be arranged in the top part of the bulb 110 so as to increase the amount of light being emitted in lateral and downward directions.

Figure 3:
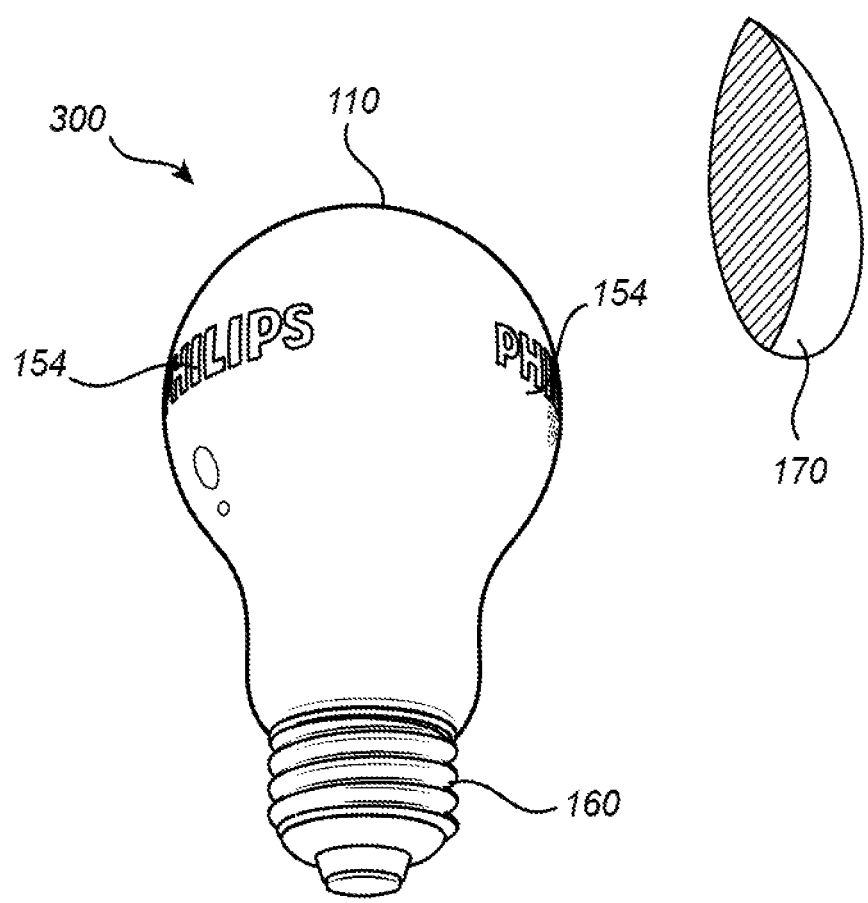
FIG. 3 shows a three-dimensional side view of a lighting device according to an embodiment.

FIG. 3 illustrates a lighting device 300 according to an embodiment, which may be similarly configured as the lighting devices described with reference to FIGS. 2*a*-*d*. The present embodiment however differs in that the optical structure 150 may be introduced to stamp a visual pattern, such as a trademark 154 on the outer surface of the bulb 110. The light scattering properties can be made different for the logo 154 and the rest of the bulb 110 surface. This makes the logo 154 visible in the OFF-state of the lighting device 300, thereby allowing for a potential buyer or user to inspect the logo 154 under e.g. ambient light to verify that the lighting device 300 is a genuine product and not a counterfeit one. However, in the ON-state the light emitted from the lighting device 300 may dazzle the eye of the observing buyer or user. In such case, the logo 154 may be made visible with the aid of an external focusing lens 170, which is arranged to be external to (and separate from) the bulb 110 and to project an image of the logo 154 on e.g. a wall or surface. The observer may then inspect the projected logo 154 to verify authenticity of the product.

Figures 4A, 4B:
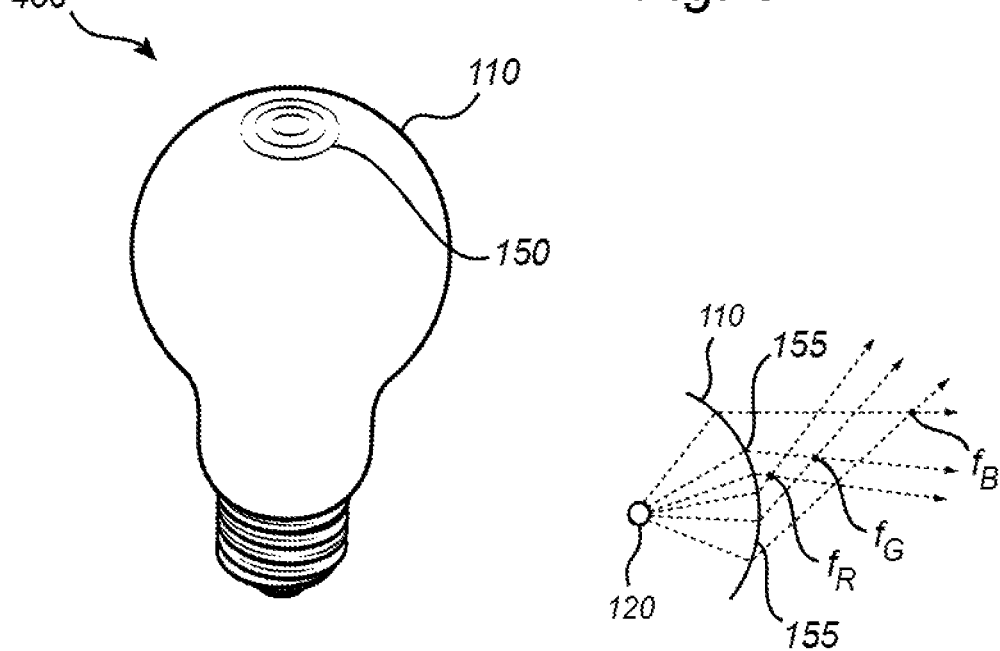
Figure 4C:
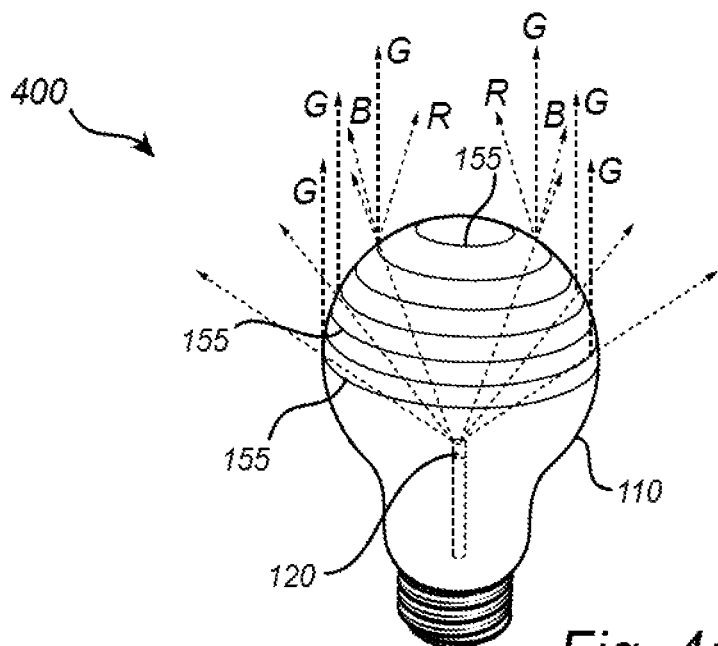

FIG. 4*a*-*c* show a lighting device 400 according to an embodiment similar to the embodiments as described in connection with FIGS. 2 and 3. According to this embodiment, the optical structure 150 comprises concentric diffraction gratings or rings 155 that e.g. may be embossed in the bulb 110 and designed in such a way that a colored spot appears in the far field or at a specific distance of e.g. 20-30 cm. The grating pitch may depend on the angle of incidence of the LED light. FIG. 4b shows a cross sectional portion of the envelope 110, wherein light may be emitted from the light source 120 and diffracted by the grating rings 155 arranged at the surface of the envelope and at different incident angles as seen from the light source 120. In this example, an outer one of the grating rings 155 may be configured to diffract light such that a blue spot may be generated in the focal point $f_B$ of the outer grating ring. Further, a green spot may be generated in the focal point $f_G$ of a middle grating ring, and a red spot in the focal point $f_R$ of an inner grating ring. Each colored spots may e.g. appear at different distances from the lighting device 400.

FIG. 4c shows an example wherein the diffractive grating may be configured to generate a green colored spot in the far field, whereby the grating pitch of three concentric grating rings arranged in a plane orthogonal to the optical axis O may be chosen as 635 nm/855 nm/1610 nm for the grating rings that are at an angle of incidence of 60°/40°/20°, respectively. As shown by the arrows in FIG. 4c, the green light may be diffracted by each one of the grating rings and exit the envelope 110 in a direction parallel to the optical axis, wherein the remaining light continues in another direction. It will however be appreciated that the optical structure 150 or grating may be adapted to generate further colors, such as blue and green, as indicated in FIG. 4c.

Figures 5A, 5B:
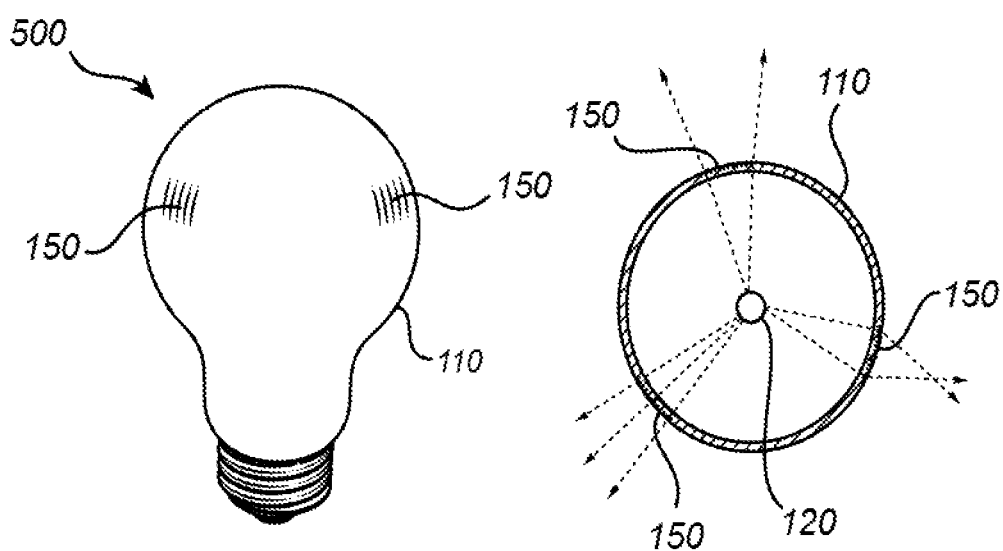
FIGS. 5a and b show a three-dimensional side view and a cross sectional top view, respectively, of a lighting device according to an embodiment.

FIGS. 5a and b illustrate a lighting device 500 according to an embodiment similarly configured as the embodiments described with reference to FIGS. 2-4. According to the present embodiment, the optical structure 150 comprises decorative patterns, such as patches of Fresnel lenses or other structures which may create a pattern in far field. The size, orientation and position of the patches or regions provided with the optical structure may be adapted depending on the desired result or optical effect. As shown by the cross section of FIG. 5b, the optical structure 150 may also be configured to focus light at a certain point or distance from the lighting device 500.

Figure 6A:
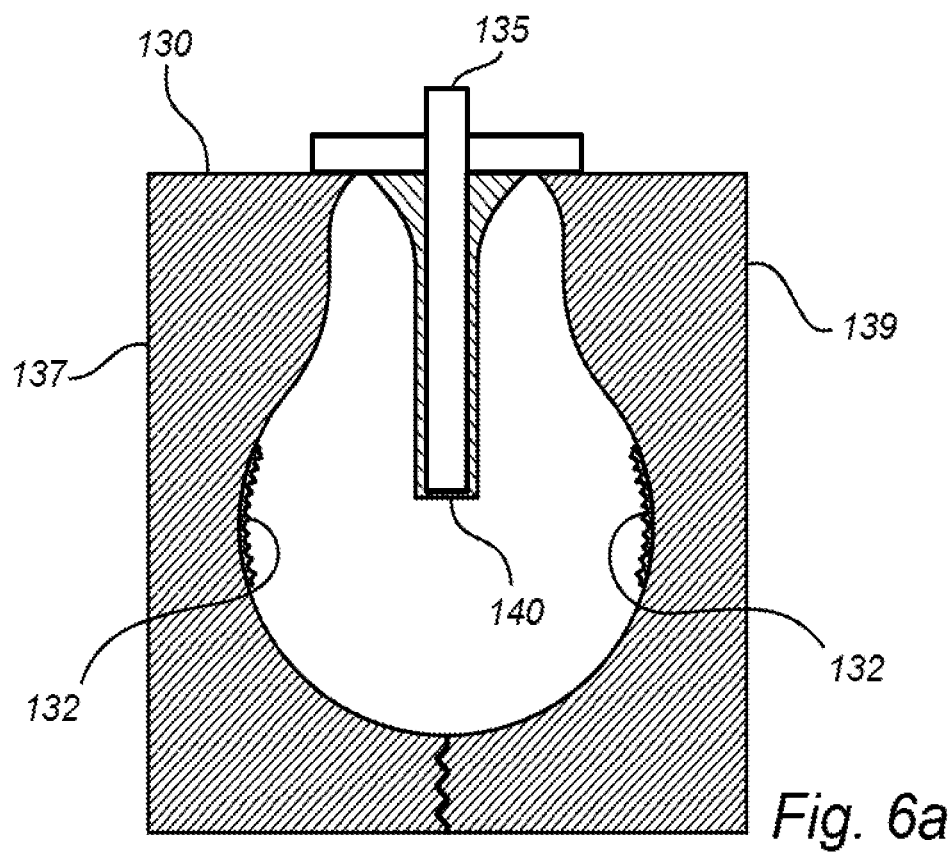
FIGS. 6a to c schematically illustrate a blow molding process according to an embodiment.
Figure 6B:
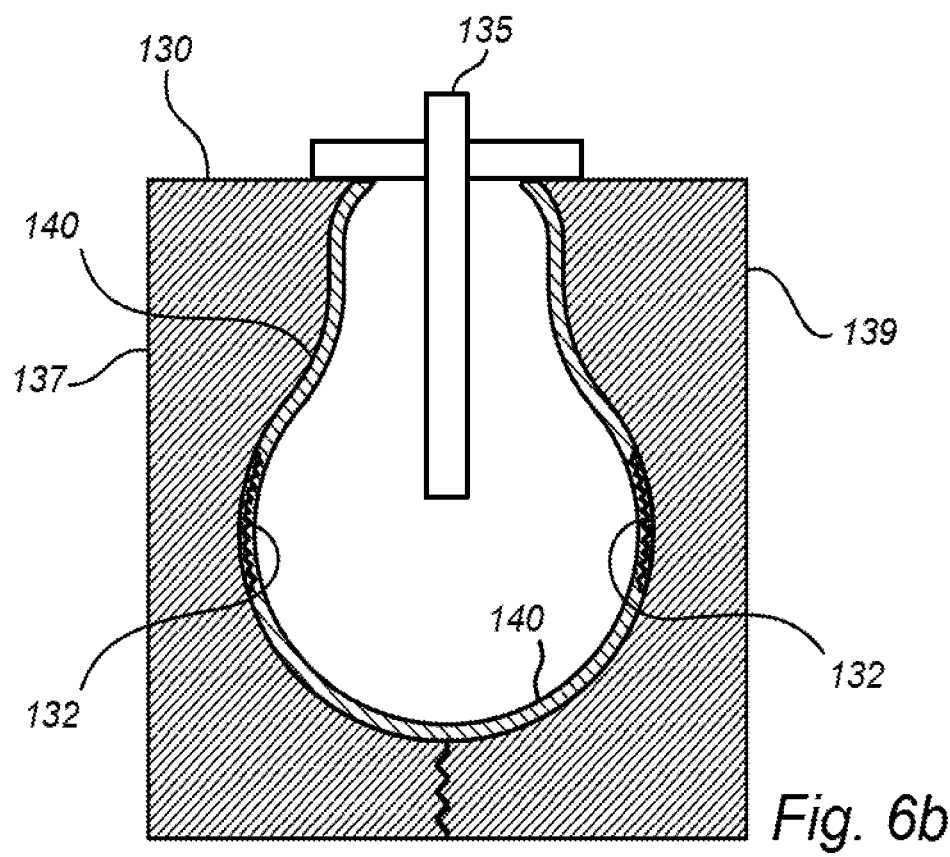
Figure 6C:
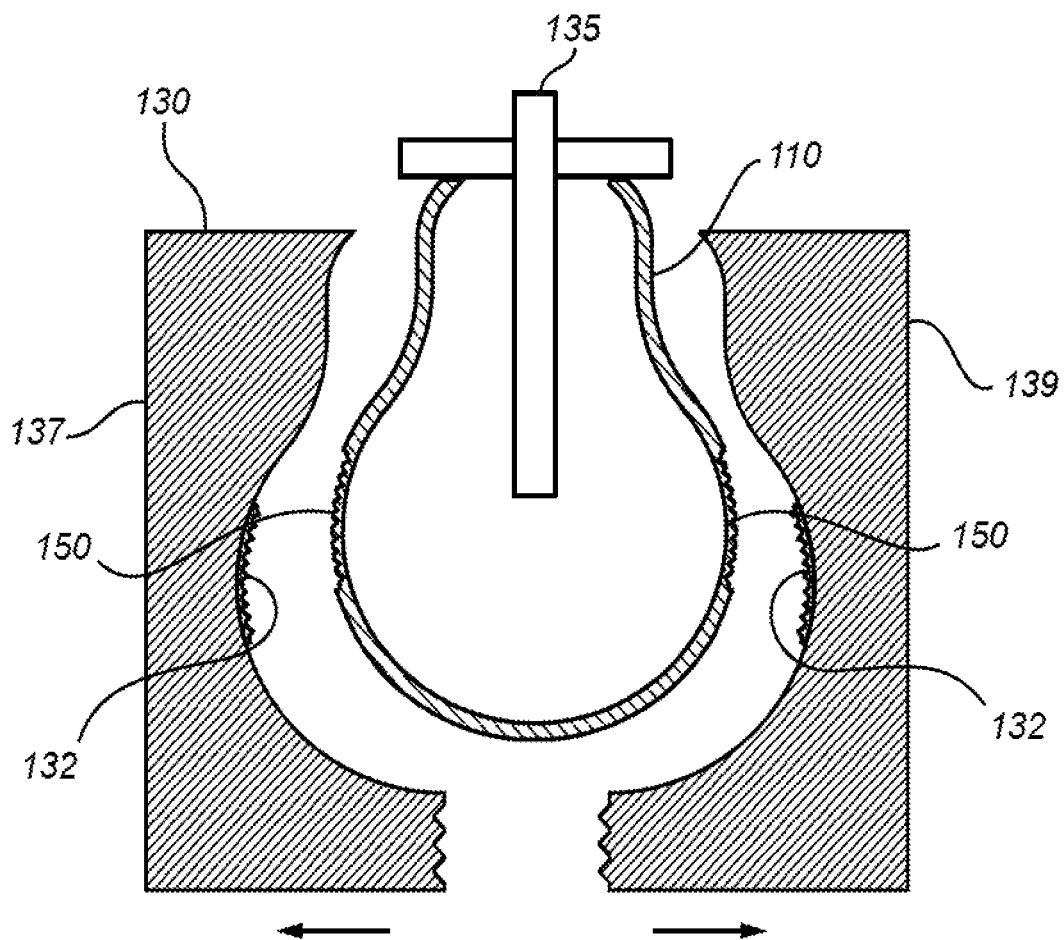

FIGS. 6a-c illustrate a blow molding process according to an embodiment of the present invention. The mold 130 has a surface structure 132 arranged on an inner surface portion of the mold 130. The mold 130 comprises two parts 137, 139 that can be joined during the blow molding process and disjoined so as to allow for the blow molded envelope 110 to be removed from the mold. In FIG. 6a, an at least partly light transmitting plastic material 140, which may be arranged on a blowing rod 135, has been introduced in the mold 130. In FIG. 6b, the plastic material 140 has been expanded by e.g. air, supplied by the blowing rod 135, such that the plastic material 140 forms a thin plastic layer that may be pressed against the inner surface of the mold 130 and hence against the surface structure 132. The surface structure 132, which may comprise both extrusions and indentations, hence forms an imprint or embossing in an outer surface of the plastic layer, thereby transferring the surface structure 132 of the mold 140 into an optical structure 150 at the resulting envelope 110. As shown in FIG. 6c, the mold 130 may be disjoined, the blowing rod 135 retracted and the blow molded envelope 110 removed.

Figure 7:
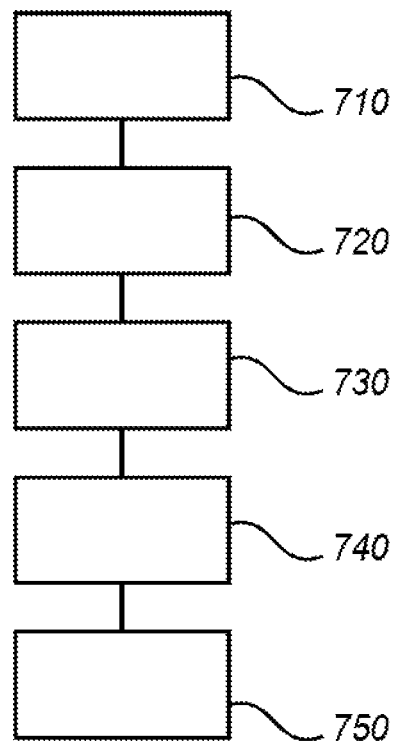
FIG. 7 is a flow chart illustrating a method for manufacturing a lighting device according to an embodiment.

FIG. 7 schematically illustrates a method according to an embodiment of the present invention. The method comprises:

arranging 710 a plastic material 140 in a mold 130 having a surface structure 132 arranged on an inner surface portion of the mold 130;

blow molding 720 the plastic material 140 so as to form the envelope 110, the surface structure being at least partly transferred to the plastic material 140 to form an optical structure 150 on a portion of an outer surface of the envelope 110;

removing 730 the envelope 110 from the mold 130;

arranging 740 the envelope 110 to at least partly enclose a solid state light source 120; and optionally arranging a light refracting lens 750 in an optical path of the lighting device 100 to focus a visual pattern in the far field, wherein the visual pattern may be formed of light being diffracted by the optical structure 150.

Thus, the present invention provides a lighting device, which may comprise an at least partly light transmitting envelope and a solid state light source. The envelope may be blow molded and provided with an optical structure that may be transferred to a surface of the envelope from a mold used during a blow molding process. The optical structure may e.g. be a diffractive or refractive optical structure and designed for providing optical effects such as collimation, scattering, lensing, various watermarking or trademarking optical effects, and far field and near field effects.

The person skilled in the art realizes that the present invention by no means is limited to the embodiments described above. On the contrary, many modifications and variations are possible within the scope of the appended claims. By means of the above-described lighting device, the envelope, even if referred to as a bulb, may be formed into almost any form capable of transmitting light and at least partly enclose a light source. Further, the blow molding technique could also be used according to some embodiments of the invention to provide a tube for tube lighting (TL), or any other type of luminaire requiring a shaped envelope or bulb. Additionally, the mere fact that certain measures are recited in mutually different dependent claims does not indicate that a combination of these measures cannot be used to advantage. Any reference signs in the claims should not be construed as limiting the scope.

The invention claimed is:

1. A method for manufacturing a lighting device comprising an at least partly light transmitting envelope and a solid state light source, said method comprising:

arranging an at least partly light transmitting plastic material in a mold having a surface structure arranged on an inner surface portion of the mold, blow molding the plastic material so as to form the at least partly light transmitting envelope, the surface structure being at least partly transferred to the at least partly light transmitting plastic material to form an optical structure on a portion of an outer surface of the at least partly light transmitting envelope, removing the at least partly light transmitting envelope from said mold, arranging the at least partly light transmitting envelope to at least partly enclose the solid state light source, and arranging a light refracting lens in an optical path of the lighting device to focus a visual pattern in the far field, wherein said visual pattern is formed of light being diffracted by the optical structure.

2. The method according to claim 1, wherein the at least partly light transmitting envelope is shaped like a bulb or a tube.

3. The method according to claim 1, wherein the optical structure comprises at least one of grooves, protrusions, micro grooves, micro protrusions, micro prismatic protrusions, a lens, a Fresnel lens or a diffraction grating.

4. The method according to claim 1, wherein the optical structure is adapted to diffract light exiting the at least partly light transmitting envelope such that a visual pattern is formed in the far field and/or in the near field.

5. The method according to claim 1, wherein the optical structure is adapted to diffract light exiting the at least partly light transmitting envelope so as to provide a predetermined color distribution.

6. The method according to claim 1, wherein the optical structure is adapted to diffract and/or refract light exiting the at least partly light transmitting envelope so as to provide a predetermined angle distribution of said light.

7. The method according to claim 1, wherein the optical structure is adapted to form a visual pattern at the outer surface portion of the at least partly light transmitting envelope, and/or adapted to diffract light from the solid state light source such that a visual pattern is formed at the outer surface portion of the at least partly light transmitting envelope.

8. The method according to claim 1, wherein the optical structure is arranged to reflect light back into an interior of the at least partly light transmitting envelope.

* * * * *